Patented Mar. 14, 1939

2,150,422

UNITED STATES PATENT OFFICE 2,150,422

HYDROGENATED FURYL AMINE DERIVATIVES

Howard I. Cramer, Cuyahoga Falls, Ohio, assignor to Wingfoot Corporation, Wilmington, Del., a corporation of Delaware No Drawing. Application November 5, 1934, Serial No. 751,590

10 Claims. (Cl. 260—345)

This invention relates to a new class of compounds which may be called carbon bisulphide derivatives of amines containing a hydrogenated furane ring. The compounds are simply prepared and are valuable as accelerators of the vulcanization of rubber.

The invention resides in the discovery of compounds which are illustrated by the formula

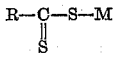

M representing metal, ammonium, substituted ammonium, dinitro aryl, aryl methylene, the group

or the group

and R in all instances representing an amino group containing a radical comprising a hydrogenated furane ring. Typical of such materials are (1) The metal salts of hydrogenated furfuryl dithiocarbamates such as, for example, zinc ethyl tetrahydro alpha furfuryl dithiocarbamate having the formula:

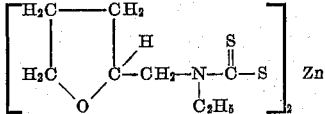

(2) The ammonium salts such as, for example, di(tetrahydro alpha furfuryl) ammonium di(tetrahydro alpha furfuryl) dithiocarbamate having the formula:

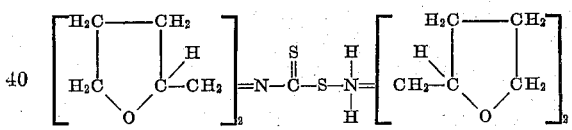

(3) The thiuram disulphides such as, for example, dibutyl di(tetrahydro alpha furfuryl) thiuram disulphide having the formula:

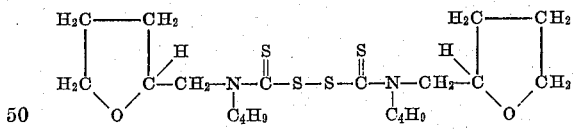

(4) The thiuram mono sulphides, such as, for example, tetra tetrahydro alpha furfuryl) thiuram mono sulphide having the formula:

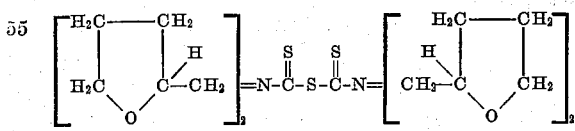

Others are dinitro phenyl di(tetrahydro alpha furfuryl) dithiocarbamate and phenyl methylene (benzal) bis di(tetrahydro alpha furfuryl) dithiocarbamate.

The methods of preparation of these new dithiocarbamic acid derivatives are similar to those employed for known dithiocarbamic acid derivatives. Thus, the substituted ammonium salts may be prepared by treating two mols of the desired amine containing a hydrogenated furane ring with one mol of carbon disulphide in an inert solvent, such as gasoline or petroleum ether, from which the salts readily precipitate. The metallic salts are preferably prepared by the addition of a soluble salt of a metal to an aqueous solution of the sodium dithiocarbamate, the latter being prepared by treating one mol of the amine containing a hydrogenated furane ring with one mol of carbon disulphide and one mol of sodium hydroxide in aqueous solution. The thiuram disulphide may be conveniently prepared by the oxidation of the sodium salt of the dithiocarbamate in aqueous solution with ammonium persulphate. The thiuram mono sulphide may be prepared from the thiuram disulphide by desulphurizing the latter by treating it in alcohol solution with one mol of potassium cyanide. The dinitrophenyl esters are prepared by adding to a molar quantity of the sodium dithiocarbamate in alcohol or water one mol of dinitro chlor benzene in warm alcohol. The phenyl methylene (benzal) derivative is prepared similarly by reacting the sodium dithiocarbamate with benzal chloride and heating the mixture to 60–70° C. for a short time.

The amines containing a hydrogenated furane ring of the invention are generally and most easily prepared by hydrogenation processes and are those amines in which the double bonds of the furane ring are saturated, wholly or partially. While the tetrahydro furfuryl amines are the preferred class of amines of the invention, it will be understood that the invention extends to the partially saturated amines such as the dihydro furyl amines which, while not generally preparable by hydrogenation processes, may be obtained by synthesis. For the purposes of simplicity the term amines containing a hydrogenated furane ring is used herein to include those amines containing a fully or partially saturated furane ring, however prepared.

The amines containing a hydrogenated furane ring applicable for use in the practice of the invention may be represented by the formula

wherein R' is a group containing a hydrogenated furane ring, such as, for example, the tetrahydro alpha furfuryl group; and R'' is a monovalent radical such as hydrogen or alkyl, alicyclic, furyl, tetrahydro alpha furfuryl or aralkyl groups. In general, any primary or secondary amine containing a hydrogenated furane ring and in which aliphatic characteristics predominate may be employed in the practice of the invention.

Illustrative of the primary and secondary amines containing a hydrogenated furane ring are tetrahydro alpha furyl amine, tetrahydro beta furyl amine, tetrahydro alpha furfuryl amine, tetrahydro beta furfuryl amine, di tetrahydro alpha- and beta- furfuryl amines, N-tetrahydro alpha furfuryl alpha furfuryl amine, N-ethyl tetrahydro alpha- and beta- furfuryl amines, N-cyclohexyl tetrahydro alpha- and beta- furfuryl amines, N-benzyl tetrahydro alpha- and beta- furfuryl amines, di tetrahydro alpha- and beta- furyl amines, di(2-tetrahydro, alpha or beta, furyl ethyl) amines, N-methyl tetrahydro alpha furfuryl amine, N-ethyl tetrahydro alpha furyl amine, N-isobutyl tetrahydro alpha furfuryl amine, N-isoamyl tetrahydro alpha furfuryl amine, N-n-butyl tetrahydro alpha furfuryl amine, N-beta phenyl ethylene tetrahydro alpha furfuryl amine, and the N-hexahydro tolyl tetrahydro alpha- and beta- furfuryl amines.

Further exemplary of the invention are the following tables describing the properties of illustrative examples. Table I gives the melting points, if a solid compound, and the colors of the compounds. Table II gives the nitrogen, sulphur and metal, if any, contents for the compounds as compared with the theoretical percentages.

Table I

| Compound | Melting point, °C. | Color |
|---|---|---|
| 1. Di (tetrahydro alpha furfuryl) ammonium di (tetrahydro alpha furfuryl) dithiocarbamate. | 107-8 | White. |
| 2. Zinc di (tetrahydro alpha furfuryl) dithiocarbamate. | 154-6 | Do. |
| 3. Lead di (tetrahydro alpha furfuryl) dithiocarbamate. | 124-6 | Buff. |
| 4. Tetra (tetrahydro alpha furfuryl) thiuram disulphide. | Oil | Red-brown. |
| 5. Tetra (tetrahydro alpha furfuryl) thiuram mono sulphide. | Oil | Red. |

Table II

| Compound | Analyses in percent | | | | | |
|---|---|---|---|---|---|---|
| | Found | | | Calculated | | |
| | Nitrogen | Sulphur | Metal | Nitrogen | Sulphur | Metal |
| 1 | 6.26 | 14.54 | | 6.27 | 13.71 | |
| 2 | 4.80 | 21.90 | 12.71 | 4.77 | 21.86 | 11.15 |
| 3 | 3.81 | 17.25 | 29.51 | 3.85 | 17.67 | 28.45 |
| 4 | 5.36 | 24.65 | | 5.38 | 24.63 | |
| 5 | 5.93 | 18.87 | | 5.74 | 19.71 | |

Further illustrative of dithiocarbamates and thiuram sulphides derived from amines containing a hydrogenated furane ring are potassium di(tetrahydro alpha furfuryl) dithiocarbamate, penta methylene ammonium tetrahydro alpha furfuryl dithiocarbamate, ammonium N-cyclo hexyl tetrahydro alpha furfuryl dithiocarbamate, zinc benzyl tetrahydro alpha furfuryl dithiocarbamate, lead ethyl tetrahydro alpha furfuryl dithiocarbamate, iso butyl tetrahydro alpha furfuryl ammonium isobutyl tetrahydro alpha furfuryl dithiocarbamate, ammonium n-propyl tetrahydro alpha furfuryl dithiocarbamate, zinc iso amyl tetrahydro alpha furfuryl dithiocarbamate, and sodium beta phenyl ethylene tetrahydro furfuryl thiocarbamate. Others are di morpholyl di (tetrahydro alpha furfuryl) thiuram di- and mono-sulphides, dicylo hexyl di-(tetrahydro alpha furfuryl) thiuram di- and mono-sulphides, diethyl di(tetrahydro alpha furfuryl) thiuram di- and mono-sulphides, dibenzyl ditetrahydro alpha furfuryl thiuram di- and mono-sulphides, dimethyl di(tetrahydro alpha furfuryl) thiuram di- and mono-sulphides, di hexahydro tolyl di(tetrahydro alpha furfuryl) thiuram di- and mono-sulphides, and di(alpha furfuryl) di(tetrahydro alpha furfuryl) thiuram di- and mono-sulphides. Still others are tetrahydro alpha furfuryl ammonium tetrahydro alpha furfuryl dithiocarbamate, zinc tetrahydro alpha furfuryl dithiocarbamate, lead tetrahydro alpha furfuryl dithiocarbamate, and di(tetrahydro alpha furfuryl) thiuram di- and mono-sulphides.

It is intended that the patent shall cover, by suitable expression in the appended claims, whatever features of patentable novelty reside in the invention.

What I claim is:

1. A normal zinc salt of a dithiocarbamic acid in which the nitrogen atom of the dithiocarbamic acid group is attached to a radical selected from the group consisting of tetrahydrofuro, tetrahydrofuromethylene and tetrahydrofuroethylene radicals.

2. An amine salt of a dithiocarbamic acid in which the nitrogen atom of the dithiocarbamic acid group is attached to a radical selected from the group consisting of tetrahydrofuro, tetrahydrofuromethylene and tetrahydrofuroethylene radicals.

3. Zinc di - N-N-(alphatetrahydrofuromethylene) dithiocarbamate.

4. Di - N'-N'-(alphatetrahydrofuromethylene) ammonium di-N-N-(alphatetrahydrofuromethylene) dithiocarbamate.

5. A normal metal salt of an N-hydrocarbon N-alphatetrahydrofuromethylene dithiocarbamic acid.

6. A binary alphatetrahydrofuromethylene ammonium N-hydrocarbon N-alphatetrahydrofuromethylene dithiocarbamate.

7. A normal bivalent metal salt of di-N-N-(alphatetrahydrofuromethylene) dithiocarbamic acid.

8. An ammonium salt of an N-hydrocarbon N-alphatetrahydrofuromethylene dithiocarbamic acid.

9. A normal zinc salt of an N-hydrocarbon N-alphatetrahydrofuromethylene dithiocarbamic acid.

10. A dithiocarbamate selected from the group consisting of the normal metal, ammonium, and amine salts of a dithiocarbamic acid in which the thiocarbamyl nitrogen is attached to a radical selected from the group consisting of tetrahydrofuro, tetrahydrofuromethylene, and tetrahydrofuroethylene radicals.

HOWARD I. CRAMER.